US008039102B1

(12) United States Patent
Lavature et al.

(10) Patent No.: US 8,039,102 B1
(45) Date of Patent: Oct. 18, 2011

(54) REINFORCED FILM FOR BLAST RESISTANCE PROTECTION

(75) Inventors: Adalbert E. Lavature, Huntington, MA (US); Robert Covey, Branford, CT (US); Jerry Serra, Chelmsford, MA (US); Gordon Brown, Anderson, SC (US); Duarte Pimentel, Acushnet, MA (US)

(73) Assignee: Berry Plastics Corporation, Evansville, IN (US)

( * ) Notice: Subject to any disclaimer, the term of this patent is extended or adjusted under 35 U.S.C. 154(b) by 369 days.

(21) Appl. No.: 12/015,384

(22) Filed: Jan. 16, 2008

Related U.S. Application Data

(60) Provisional application No. 60/880,554, filed on Jan. 16, 2007.

(51) Int. Cl.
*B32B 7/12* (2006.01)
*B32B 25/02* (2006.01)
*B32B 33/00* (2006.01)

(52) U.S. Cl. ...... 428/343; 428/40.1; 428/42.3; 428/354; 428/911; 442/37; 442/38; 442/41

(58) Field of Classification Search ............... 442/38, 442/41, 49; 52/506.01, 783.1; 428/343–354, 428/40.1–42.3
See application file for complete search history.

(56) References Cited

U.S. PATENT DOCUMENTS

| 230,228 A | 7/1880 | Boyd |
|---|---|---|
| 1,444,405 A | 2/1923 | Wagemaker |
| 1,990,656 A | 2/1935 | Kotrbaty |
| 2,104,872 A | 1/1938 | Levy |
| 2,235,001 A | 8/1938 | Allen |
| 2,806,277 A | 5/1950 | Hand et al. |
| 3,029,172 A | 4/1962 | Glass |
| 3,235,039 A | 2/1966 | O'Donnell |
| 3,522,140 A | 7/1970 | Hartzell et al. |
| 3,648,613 A | 3/1972 | Cunn |
| 3,649,324 A | 3/1972 | Payne |
| 3,703,201 A | 11/1972 | Musyt et al. |
| 3,801,416 A | 4/1974 | Gulbierz |
| 4,104,842 A | 8/1978 | Rockstead et al. |
| 4,125,984 A | 11/1978 | Jonas |
| 4,139,591 A | 2/1979 | Jurisich |
| 4,175,357 A | 11/1979 | Goldhaber |
| 4,185,437 A | 1/1980 | Robinson |
| 4,226,071 A | 10/1980 | Bennett |
| 4,253,288 A | 3/1981 | Chun |
| 4,269,004 A | 5/1981 | Schiebroek |
| 4,297,820 A | 11/1981 | Artzer |
| 4,416,096 A | 11/1983 | Schuster et al. |
| 4,505,208 A | 3/1985 | Goldman |
| 4,558,552 A | 12/1985 | Reitter, II |
| 4,562,666 A | 1/1986 | Young, III |
| 4,616,456 A | 10/1986 | Parker |
| 4,625,484 A | 12/1986 | Oboler |
| 4,640,074 A | 2/1987 | Paakkinen |
| 4,664,967 A | 5/1987 | Tasdemiroglu |
| 4,730,023 A | 3/1988 | Santo et al. |
| 4,731,972 A | 3/1988 | Anderson |
| 4,732,803 A | 3/1988 | Smith, Jr. |
| 4,780,351 A | 10/1988 | Czempoyesh |
| 4,822,657 A | 4/1989 | Simpson |
| 4,970,838 A | 11/1990 | Phillips |
| 5,037,690 A | 8/1991 | Van Der Kooy |
| 5,076,168 A | 12/1991 | Yoshida et al. |
| 5,104,726 A | 4/1992 | Ross |
| 5,124,195 A | 6/1992 | Hardell et al. |
| 5,190,802 A | 3/1993 | Pilato |
| 5,200,256 A | 4/1993 | Dunbar |
| 5,249,534 A | 10/1993 | Sacks |
| 5,316,839 A | 5/1994 | Kato et al. |
| 5,347,775 A | 9/1994 | Santos |
| 5,487,248 A | 1/1996 | Artzer |
| 5,517,894 A | 5/1996 | Bohne et al. |
| 5,524,412 A | 6/1996 | Corl |
| 5,563,364 A | 10/1996 | Alhamad |
| 5,576,511 A | 11/1996 | Alhamad |
| 5,582,906 A | 12/1996 | Romesberg et al. |
| 5,591,933 A | 1/1997 | Li et al. |
| 5,649,398 A | 7/1997 | Isley, Jr. et al. |
| 5,811,719 A | 9/1998 | Madden, Jr. |
| 5,813,174 A | 9/1998 | Waller |
| 5,822,940 A | 10/1998 | Carlin et al. |
| 5,856,426 A | 1/1999 | Takahashi et al. |

(Continued)

FOREIGN PATENT DOCUMENTS

JP 62-273827 11/1987

(Continued)

OTHER PUBLICATIONS

Vossoughi et al., "Resistance of Concrete Protected by Fabric to Projectile Impact", Cement and Concrete Research 37 (2007), 96-106, (11 Pgs).

(Continued)

*Primary Examiner* — D Lawrence Tarazano
*Assistant Examiner* — Ricardo E Lopez
(74) *Attorney, Agent, or Firm* — Barnes & Thornburg LLP

(57) ABSTRACT

Embodiments of the present invention generally relate to a reinforced film for blast resistance protection and methods thereof. More specifically, embodiments of the present invention relate to a reinforced film comprising an elastomeric polymer laminate, and a scrim layer at least partially embedded in the elastomeric polymer laminate layer, wherein the reinforced film comprises a puncture resistance of at least five thousand pounds per square inch.

43 Claims, 2 Drawing Sheets

U.S. PATENT DOCUMENTS

| | | | |
|---|---|---|---|
| 5,937,595 | A | 8/1999 | Miller |
| 5,974,762 | A | 11/1999 | Rodgers |
| 6,021,524 | A | 2/2000 | Wu et al. |
| 6,053,662 | A | 4/2000 | Scuero |
| 6,099,768 | A | 8/2000 | Strickland et al. |
| 6,112,489 | A | 9/2000 | Zweig |
| 6,138,420 | A | 10/2000 | Fyfe |
| 6,161,462 | A | 12/2000 | Michaelson |
| 6,176,920 | B1 | 1/2001 | Murphy et al. |
| 6,212,840 | B1 | 4/2001 | Davidovitz |
| 6,269,597 | B1 | 8/2001 | Haas |
| 6,298,607 | B1 | 10/2001 | Mostaghel et al. |
| 6,298,882 | B1 | 10/2001 | Hayes et al. |
| 6,309,732 | B1 | 10/2001 | Lopez-Anido et al. |
| 6,314,858 | B1 | 11/2001 | Strasser et al. |
| 6,439,120 | B1 | 8/2002 | Bureaux et al. |
| 6,455,131 | B2 | 9/2002 | Lopez-Anido et al. |
| 6,460,304 | B1 | 10/2002 | Kim |
| 6,500,775 | B1 | 12/2002 | Mantegna |
| 6,503,855 | B1 | 1/2003 | Menzies et al. |
| 6,524,679 | B2 | 2/2003 | Hauber et al. |
| 6,543,371 | B1 | 4/2003 | Gardner |
| 6,548,430 | B1 | 4/2003 | Howland |
| 6,703,104 | B1 | 3/2004 | Neal |
| 6,709,736 | B2 | 3/2004 | Gruber et al. |
| 6,718,861 | B1 | 4/2004 | Anderson, Jr. et al. |
| 6,745,535 | B2 | 6/2004 | Nordgren et al. |
| 6,806,212 | B2 | 10/2004 | Fyfe |
| 6,820,381 | B1 | 11/2004 | Ballough |
| 6,841,791 | B2 | 1/2005 | DeMeo et al. |
| 6,873,920 | B2 | 3/2005 | Dunleavy et al. |
| 6,898,907 | B2 | 5/2005 | Diamond |
| 6,907,811 | B2 | 6/2005 | White |
| 6,927,183 | B1 | 8/2005 | Christen |
| 6,991,124 | B1 | 1/2006 | Palley et al. |
| 7,067,592 | B2 | 6/2006 | Chino et al. |
| 7,077,048 | B1 | 7/2006 | Anderson, Jr. et al. |
| 7,138,175 | B2 | 11/2006 | Sainto |
| 7,148,162 | B2 | 12/2006 | Park et al. |
| 7,148,313 | B2 | 12/2006 | Koga et al. |
| 7,185,778 | B1 | 3/2007 | Palley et al. |
| 2002/0160144 | A1 | 10/2002 | Higgins et al. |
| 2002/0184841 | A1 | 12/2002 | Diamond |
| 2003/0079430 | A1 | 5/2003 | Hanks |
| 2003/0104738 | A1 | 6/2003 | Porter |
| 2003/0129900 | A1 | 7/2003 | Chiou |
| 2003/0148681 | A1 | 8/2003 | Fyfe |
| 2003/0199215 | A1 | 10/2003 | Bhatnagar et al. |
| 2004/0048022 | A1 | 3/2004 | Pratt |
| 2004/0058603 | A1* | 3/2004 | Hayes ............ 442/286 |
| 2004/0103614 | A1 | 6/2004 | Hanks et al. |
| 2004/0123541 | A1* | 7/2004 | Jewett ............ 52/506.01 |
| 2004/0148890 | A1 | 8/2004 | Miniter |
| 2004/0161989 | A1 | 8/2004 | Dennis et al. |
| 2004/0166755 | A1 | 8/2004 | Bergmans et al. |
| 2004/0221534 | A1 | 11/2004 | Hanks |
| 2005/0144900 | A1 | 7/2005 | Hallissy et al. |
| 2005/0188825 | A1 | 9/2005 | Sharpe et al. |
| 2005/0223651 | A1 | 10/2005 | Lange-Kornbak et al. |
| 2005/0242093 | A1 | 11/2005 | Sharpe et al. |
| 2006/0013977 | A1 | 1/2006 | Duke et al. |
| 2006/0019062 | A1 | 1/2006 | Hanks et al. |
| 2006/0065111 | A1 | 3/2006 | Henry |
| 2006/0090673 | A1 | 5/2006 | Simmonsen et al. |
| 2006/0105156 | A1 | 5/2006 | Simmonsen et al. |
| 2006/0150554 | A1 | 7/2006 | Hanks et al. |
| 2006/0265985 | A1 | 11/2006 | Nichols |
| 2007/0006542 | A1 | 1/2007 | Duke |
| 2007/0011962 | A1 | 1/2007 | Erskine |
| 2007/0128963 | A1* | 6/2007 | Vogt et al. ............ 442/301 |
| 2009/0004430 | A1 | 1/2009 | Cummins et al. |

FOREIGN PATENT DOCUMENTS

| | | |
|---|---|---|
| JP | 02-274534 | 11/1990 |
| JP | 2574554 | 1/1997 |
| WO | WO 2004/092495 | 10/2004 |
| WO | WO 2006/050419 | 5/2006 |
| WO | WO 2007/027993 | 3/2007 |
| WO | WO 2007/073363 | 6/2007 |

OTHER PUBLICATIONS

Steve@BuildingOnline.com, "Blast Resistant Panels Being Readied for Mass Market", Sep. 1, 2004, (2 Pgs).

International Search Report dated Feb. 19, 2009, for International Application No. PCT/US2008/051207.

International Search Report dated Jul. 30, 2009 for Application PCT/US2008/051207.

"New Coating Shows Promise for Strengthening Buildings Against Terrorist Explosions." www.ml.afrl.af.mil....

"Success Story, Polyurethane Elastomer Coating Shows Promise for Strengthening Buildings Against Terrorist Explosions." Air Force Research Laboratory (AFRL).

Sinan, R.J.; Porter, J.R.; Anderl, T., "Blast Protection Elastomer Coating." AFRL Technology Horizons, Sep. 2003.

C.F. Johnson.;T.R. Slawson, Ph.D., P.E., T.K. Cummins, J.L. Davis. "Concrete Masonry Unit Walls Retrofitted with Elastomeric Systems for Blast Loads".

Johnson, Alan; "New Steel-composite Wall Sets Standard in Safe Room Security", IAPD Magazine, Apr./May 2006, 2 Pgs.

"StormBlocker Shelter System Provides Protection Against Severe Weather Events", found at http://norplex-micarta.com/products..., Oct. 20, 2005, 3 Pgs.

"The StormBLOCKER Shelter System", found at http://www.stromblocker.com/product.php, 1 Pg.

"High Performace Thermoset Composites For the Ballistic Protection Industry", found at http://norplex-micarta.com/markets..., 2 Pgs.

"ShotBLOCKER", found at http://norplex-micarta.com/markets...2 pgs.

* cited by examiner

300

REINFORCED FILM FOR BLAST RESISTANCE PROTECTION

CROSS-REFERENCE TO RELATED APPLICATIONS

This application claims priority to U.S. Provisional Patent Application Ser. No. 60/880,554, filed Jan. 16, 2007, entitled "Reinforced Film for Blast Resistance Protection," the disclosure of which is incorporated herein by reference in its entirety.

BACKGROUND OF THE INVENTION

1. Field of the Invention

Embodiments of the present invention generally relate to a reinforced film for blast resistance protection and methods thereof. More specifically, embodiments of the present invention relate to a reinforced film comprising an elastomeric polymer laminate, and a scrim layer at least partially embedded in the elastomeric polymer laminate layer, wherein the reinforced film comprises a puncture resistance of at least five thousand pounds per square inch.

2. Description of the Related Art

Structures, such as houses and buildings, depending on their location, may often be at risk of damage or destruction by enemy forces, terrorist attacks or natural disasters. It is often necessary to provide extensive protection for these structures, due to the chance they may be adversely effected by direct or proximate explosions or flying debris. In such cases, a device may be desirable to mitigate or prevent damage to the contents of these structures and to mitigate or prevent potential casualties and/or injuries.

Conventional systems for preventing or mitigating assaults on structures include, for example, the use of concrete barricades which have been designed and used to protect military buildings. However, such barriers are heavy, difficult to transport, expensive, and easily visible to enemy forces. Concrete barricades may also be a completely impractical solution in situations where the structure requiring protection is in an active war location or in a primitive third-world region. Thus, explosion blast barriers have been designed and used to protect the interior side of exterior building walls, providing greater wall integrity in the event of an explosion. In most blast barrier designs, the barriers are composed of materials that are excessively heavy, cumbersome and expensive, and simply are not practical for quick transport and deployment to a target structure. Excessive weight and decreased mobility is often the result of the barrier being too massive.

Even current improvements over such conventional barriers also have many weaknesses. For example, some more recent blast barriers are designed such that they are sprayed onto the surface to be protected. Although this solution may be practical for new building construction, application of such a barrier is not practical in many applications, in particular, in war zones and remote regions. For example, the process of coating the walls of a single room with a heavy coating of urea (most commonly used as spray for truck liners) may take up to a week to accomplish, requires cumbersome equipment, and may not provide an instant protective barrier.

Thus, a need exists for a reinforced film that provides the necessary additional structural integrity to a structure while remaining flexible, lightweight, and easy to apply.

SUMMARY OF THE INVENTION

Embodiments of the present invention generally relate to a reinforced film for blast resistance protection and methods thereof. More specifically, embodiments of the present invention relate to a reinforced film comprising an elastomeric polymer laminate, and a scrim layer at least partially embedded in the elastomeric polymer laminate layer, wherein the reinforced film comprises a puncture resistance of at least five thousand pounds per square inch.

In one embodiment, a reinforced film comprises an elastomeric polymer laminate comprising thermoplastic polyurethane or blends thereof, an aramid-based scrim layer at least partially embedded in the elastomeric polymer laminate layer, and an acrylic pressure sensitive adhesive layer disposed on the elastomeric polymer laminate.

In another embodiment, a reinforced film comprises an elastomeric polymer laminate comprising an aromatic, polyether-based thermoplastic polyurethane or blends thereof, a Kevlar-based scrim layer at least partially embedded in the elastomeric polymer laminate layer, and a pressure sensitive adhesive layer disposed on the elastomeric polymer laminate comprising between about 70.0% to about 95.0% of an acrylic pressure-sensitive adhesive, between about 5.0% to about 15.0% urethane-based pressure-sensitive adhesive, between about 0.0% and about 1.5% antioxidant, between about 1.0% and about 2.0% of a solvent, and between about 0.0% and about 1.0% of a catalyst, wherein the reinforced film comprises a puncture resistance of at least five thousand pounds per square inch.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
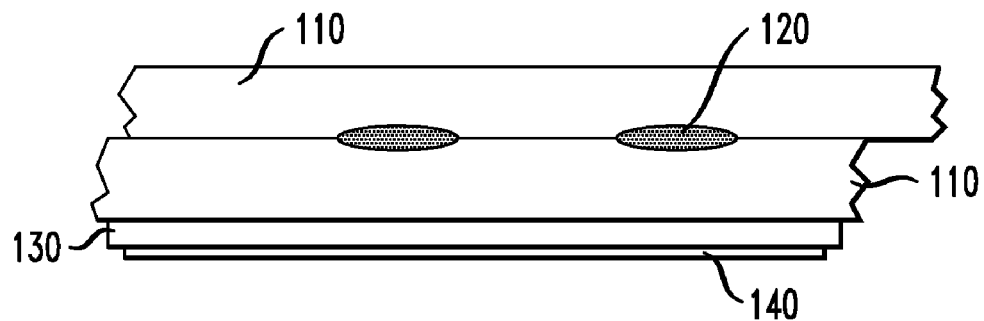
FIG. 1 depicts a cross-section of a reinforced film in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION OF THE PREFERRED EMBODIMENTS

Embodiments of the present invention generally relate to a reinforced film for blast resistance protection and methods thereof. More specifically, embodiments of the present invention may be applied to surfaces of a structure, to give such surface greater structural integrity in the event of a blast, an explosion or other catastrophic event.

General Structure of a Reinforced Film

FIG. 1 depicts a cross-section of a reinforced film in accordance with an embodiment of the present invention. Generally, a reinforced film 100 comprises at least an elastomeric polymer laminate 110, and a scrim layer 120 at least partially encapsulated within the elastomeric polymer laminate 110. In some embodiments, a plurality of elastomeric polymer laminates 110 may be provided, whereby a scrim layer 120 may be disposed between the layers of laminate 110. Optionally, the reinforced film 100 may further comprise an adhesive layer 130, and accompanying release liner 140.

The reinforced film 100, generally has an overall thickness between about 8 mils and about 50 mils. In one embodiment, the reinforced film 100 has a thickness between about 13.9 mils and about 15.3 mils. In another embodiment, the reinforced film 100 has a thickness of about 14.8 mils.

In accordance with embodiments of the present invention, the reinforced film 100 has a puncture resistance of between about 3000 psi to about 25000 psi. In another embodiment, the reinforced film has a puncture resistance of between about 10000 psi to about 20000 psi. In one embodiment, the reinforced film has a puncture resistance of at least 5000 psi.

The elastomeric polymer laminate 110 may comprise any elastomeric polymer composition, suitable for embodiments of the present invention. Generally, the elastomeric polymer laminate comprises a material exhibiting advantageous tensile strength, puncture resistance, flex fatigue resistance, low temperature flexibility, high impact strength, chemical and hydrolysis resistance, and general elastomeric properties. Exemplary materials suitable for embodiments of the present invention include materials comprising at least one of urethane, silicone, polyethylene, polypropylene, natural and synthetic rubber and blends thereof, foam, other thermoplastic elastomers or polyolefins, or the like.

In some embodiments, the elastomeric polymer laminate 110 comprises a thermoplastic urethane or blends thereof. In one embodiment, the elastomeric polymer laminate 110 comprises an aromatic, polyether-based thermoplastic polyurethane. Two exemplary aromatic, polyether-based thermoplastic polyurethanes suitable for embodiments of the present invention are commercially available from the Lubrizol Corporation (formerly Noveon International, Inc.), with offices in Cleveland, Ohio, under the trade names "Estane 58887" and "ETE 50DT3."

In exemplary embodiments of the present invention, blends of such commercially available thermoplastic polyurethanes are utilized in the elastomeric polymer laminate 110. A blend may comprise between about 30%-90% Estane 58887 by weight, and between about 10%-70% ETE 50DT3 by weight. In one embodiment, the blend comprises about 80% Estane 58887 by weight, and about 20% ETE 50DT3 by weight.

Certain embodiments comprise a multilayer elastomeric polymer laminate, where each layer of laminate may comprise different urethanes and/or different blends of urethane or other desired polymer. Each layer of laminate may incorporate other urethanes or polymers that provide different material properties. In one embodiment, a layer of laminate may comprise up to about 20% polyester-based thermoplastic polyurethane, for example, "Estane 5713," commercially available from Lubrizol Corporation.

Optionally, the elastomeric polymer layer 110 may comprise additives or stabilizers to enhance particular properties of the reinforced film 100. For example, in one embodiment, the elastomeric polymer layer 110 may comprise stabilizers to improve the UV resistance and deter thermal degradation.

In one embodiment, the stabilizers comprise any high molecular weight stabilizer. In another embodiment, the stabilizers comprise at least a hindered amine light stabilizer (HALS). In another embodiment, the light stabilizer comprises an ultraviolet light absorbing agent, such as 3,5-di-t-Butyl-4-Hydroxybenzoic Acid, Hexadecyl Ester. In another embodiment, the light stabilizer comprises an ultraviolet light absorbing agent and free radical scavenger, commercially available from CYTEC Industries, Inc., with offices in West Paterson, N.J., under the name CYASORB® UV-2908. In another embodiment, the stabilizer comprises a UV light stabilizer, commercially available from Ciba Specialty Chemicals Corp. of Tarrytown N.Y. under the name Tinuvin 765.

Antioxidants may also be added to the elastomeric polymer laminate 110 in certain embodiments. The antioxidants may include hindered phenols or multifunctional phenols such as those containing sulfur or phosphorus. The performance of either the stabilizers or the antioxidants may be further enhanced by utilizing synergists such as, for example, thiodipropionate esters and phosphites, and/or chelating agents and metal deactivators, for example, ethylenediamine tetraacetic acid, salts thereof, and disalicylalpropylenediimine.

In other embodiments, other agents may be incorporated into the elastomeric polymer laminate 110. In one embodiment, a fungicide is applied to the elastomeric polymer laminate 110 to resist fungal growth. Exemplary fungicides include miconazol, amphotericin B, nystatin, griseofulvin, and the like. Embodiments of the present invention may further comprise any bioactive agent or the like, to prevent any undesirable biological presence in the reinforced film.

The elastomeric laminate layer 110 may be provided in any suitable thickness for embodiments of the present invention. In one embodiment, the elastomeric laminate layer 110 is provided in a thickness between about 2 mils to about 75 mils. In another embodiment, the elastomeric laminate layer 110 is provided in a thickness between about 5 mils to about 50 mils.

The elastomeric laminate layer 110 may be transparent, translucent, or opaque, depending on the desired application of the reinforced film 100. Similarly, the elastomeric laminate layer 110 may any color, either natural, dyed or painted. Such coloring may be desirable to blend the reinforced film 100 into a surface, or create a visual obstruction for occupants on the inside of a structure reinforced by a reinforced film 100 of the present invention.

The scrim layer 120 generally comprises any scrim material suitable for embodiments of the present invention. Often, the scrim layer 120 comprises woven or nonwoven, natural or synthetic fibers, or the like. In one embodiment, the scrim layer 120 comprises at least one of a plurality of aromatic polyamide fibers (commonly referred to as "aramid"), para-aramid fibers, meta-aramid fibers or the like.

Exemplary suitable materials for the scrim layer 120 include para-aramid fibers (e.g., Kevlar™, Technora™, Twaron™, etc.), meta-aramid fibers (e.g., Nomex™, Teijinconex™, Kermel™, etc.) and other heat-resistant and strong synthetic fibers (e.g., sulfron, nylon, ultra high molecular weight polyethylene (UHMWPE), glass, carbon, metal or metal alloys, including copper, nickel, iron, steel, gold, silver, platinum, other conventional or high-tech alloy, etc.). In many embodiments, the scrim layer 120 comprises at least p-phenylene terephthalamides (commercially available as Kevlar™ and Twaron™) or polymetaphenylene isophthalamides (commercially available as Nomex™ or Teijinconex™).

Generally, the fibers of the scrim layer 120 are provided having between about 1000 to about 4000 denier, depending on structure of the scrim layer and the desired strength of the reinforced film 100. In one embodiment the fibers of the scrim layer 120 are provided having a denier of about 3000. In many embodiments, the fiber thread count of the scrim layer 120 may range between about 1×1 to about 50×50, depending on the strength and material selection of the scrim layer 120.

Figure 2:
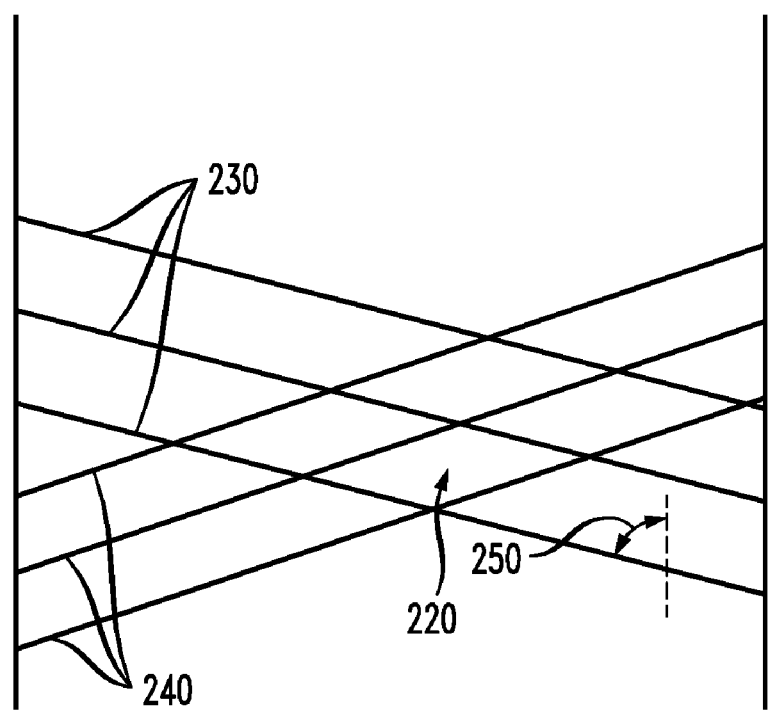
FIG. 2 depicts a schematic of the fiber scrim according with one embodiment of the present invention.

Generally, the scrim layer 120 comprises about 12-20 crossover points of fiber bundles (as described in greater detail below), and between about 6-15 windows (i.e., spacing between fiber bundles), per square inch. In another embodiment, the scrim layer 120 comprises about 16 crossover points, and about 9 windows, per square inch. Furthermore, the thickness of the scrim layer generally ranges between about 0.5 mils to about 75 mils, with a fiber bundle width of between about 0.005 inches to about 0.5 inches. In one embodiment, the thickness of the scrim layer ranges between about 5 mils to about 25 mils, with a fiber bundle width of between about 0.05 inches to about 0.15 inches FIG. 2 is a schematic of the fiber scrim according with one embodiment of the present invention. In many embodiments, the scrim layer 120 comprises a fiber weave or matrix to structurally increase the strength of the reinforced film 100. The fibers may be weaved into a predetermined shape or pattern. In one embodiment, the scrim layer 120 comprises a plurality of fibers forming a substantially diamond shaped pattern.

In one embodiment, as depicted in FIG. 2, the scrim layer 120 may comprise bi-directional fibers, or fiber bundles, 230 and 240, resulting in a diamond shaped pattern 220. In such an embodiment, an angle 250 is formed from a true warp direction 260 and the positioning of the bidirectional fiber bundles 230 and 240. In one embodiment, the angle 250 may be between approximately 40° to approximately 80°. In another embodiment of the present invention, the angle 250 may be between approximately 45° to approximately 60°.

Furthermore, the scrim layer 120 may comprise a tight weave of fiber bundles 230 and 240, such that the individual fiber bundles 230 and 240 are spaced closer together. Conversely, the scrim layer 120 may comprise a loose woven pattern, such that the fiber bundles 230 and 240 are spaced substantially apart from one another. In one embodiment of the present invention, the distance between the fibers of the scrim layer 120 may be between about 0.25 and about 0.75 inches, as calculated by measuring centerline to centerline of the bundles. In another embodiment, the spacing between the fibers may be between about 0.375 and about 0.5 inches.

The fiber bundles 230 and 240 of the scrim layer 120 generally comprise a substantially round or ovoid cross-section. In one embodiment, the fiber bundles 230 and 240 comprise a substantially flattened ovoid or rectangular cross-section, to decrease the thickness of the scrim layer 120.

In certain embodiments, the scrim layer 120 may further comprise an adhesive to bond the crossover positions of the bidirectional fiber bundles 230 and 240. Such adhesive may comprise any suitable adhesive composition for embodiments of the present invention, including any adhesive discussed herein. One exemplary bonding adhesive for the scrim layer 120 includes ethyl vinyl acetate (EVA), nylon, urethane, or the like.

Generally, the resulting strength of the scrim layer 120 may withstand a force of between approximately 80 lbs/lineal inch and approximately 1000 lbs/lineal inch. In one embodiment, the scrim layer 120 may withstand a force of between about 200 lbs/lineal inch and about 600 lbs/lineal inch.

Optionally, the scrim layer 120 may comprise additional fibers (not shown) in the warp direction, to insure good integrity of the finished scrim layer 120. These additional fibers may be constructed of any suitable material for embodiments of the present invention, including any material discussed herein. In one embodiment, the scrim layer 120 comprises additional nylon or light weight polyester fibers.

In one embodiment of the present invention, multiple scrim layers 120 may be used, such that each scrim layer 120 may be positioned substantially adjacent to each other, overlapped, separated by layers of laminate, or in any other configuration desirable.

The adhesive layer 130 may comprise any suitable adhesive for embodiments of the present invention. Generally, the adhesive layer 130 comprises a pressure-sensitive adhesive (PSA). In many embodiments, the adhesive layer 130 is a pressure-sensitive adhesive comprising at least one of silicone, natural or synthetic rubber, thermoplastic elastomer, polyurethane, water or solvent based acrylic, or the like. In alternative embodiments, the adhesive layer 130 comprises at least one of an anaerobic, cyanoacrylate, epoxy, phenolic, polyimide, hot melt, butyl-based, plastisol, polyvinyl acetate (PVA), or the like, including blends thereof.

In one embodiment of the present invention, the adhesive layer 130 comprises an acrylic pressure-sensitive adhesive, commercially available under the name "National Starch 80-178A," from National Starch and Chemical, with offices in Bridgewater, N.J. In another embodiment, the adhesive layer 130 comprises a urethane-based pressure sensitive adhesive, commercially available under the name "SZ-0670A PSA," from Worthen Industries, of Nashua, N.H. Embodiments of the present invention contemplate the combination or blend of multiple types of adhesive compositions to achieve advantageous characteristics of the reinforced film 100.

Antioxidants may also be added to the adhesive layer 130 in certain embodiments. The antioxidants may include hindered phenols or multifunctional phenols such as those containing sulfur or phosphorus. In one embodiment, the adhesive layer 130 comprises an antioxidant, commercially available under the name "BNX-1225 Mayzo," from McDonald, of Pennsylvania. The adhesive layer 130 may further comprise solvents suitable for embodiments of the present invention. In one embodiment, a solvent comprises methylbenzene or phenylmethane, also known as Toluene.

The performance of the adhesive layer 130 may be further enhanced by utilizing synergists, for example, thiodipropionate esters and phosphites, or chelating agents, metal deactivators, for example, ethylenediamine tetraacetic acid, salts thereof, and disalicylalpropylenediimine, or catalysts, for example, isocyanate-catalysts, hydroxyl-catalysts and the like. In one embodiment, the adhesive layer 130 further comprises an isocyanate-catalyst, commercially available under the name "Mondor MR-Light," from Mozel Industries, of Columbia, Ill.

Optionally, the adhesive layer 130 may comprise additives or stabilizers to enhance particular properties of the adhesive. For example, in one embodiment, the adhesive layer 130 may comprise stabilizers to improve the UV resistance and deter thermal degradation.

In one embodiment, the stabilizers comprise any high molecular weight stabilizer. In another embodiment, the stabilizers comprise at least a hindered amine light stabilizer (HALS). In another embodiment, the light stabilizer comprises an ultraviolet light absorbing agent, such as 3,5-di-t-Butyl-4-Hydroxybenzoic Acid, Hexadecyl Ester. In another embodiment, the light stabilizer comprises an ultraviolet light absorbing agent and free radical scavenger, commercially available under the name CYASORB® UV-2908. In another embodiment, the stabilizer comprises a UV light stabilizer, commercially available under the name Tinuvin 765.

In one embodiment of the present invention, the adhesive layer 130 is provided in a composition comprising between about 70.0% to about 95.0% of an acrylic pressure-sensitive adhesive, between about 5.0% to about 15.0% urethane-based pressure-sensitive adhesive, between about 0.0% and about 1.5% antioxidant, between about 1.0% and about 2.0% of a solvent, and between about 0.0% and about 1.0% of a catalyst. In another embodiment of the present invention, the adhesive layer may comprise about 86.56% acrylic pressure-sensitive adhesive, about 11.08% urethane-based pressure sensitive adhesive, about 0.75% antioxidant, about 1.5% toluene, and about 0.11% isocyanate catalyst.

Generally, the adhesive layer 130 may be between about 2 mils to about 75 mils thick. In one embodiment, the adhesive layer 130 is between about 6 mils to about 10 mils thick. In another embodiment, the adhesive layer 130 is between about 6.8 mils to about 7.2 mils thick.

The optional release liner 140 may be applied to an exposed side of the adhesive layer 130. The release liner 140 material may be a silicone liner material, or non-silicone liner material, such as polyvinyl octadecylcarbamate. Other types of release liners 140 include, but are not limited to polyvinyl stearylcarbamate, vinyl acrylic emulsion release liner material, and a fluorochemical emulsion with an acrylic backbone.

In alternative embodiments, the release liner 140 may be provided as a layer applied on the elastomeric polymer laminate 110. In such an embodiment, if the reinforced film 100 is provided in a roll, the force required to unroll the reinforced film 100 is substantially less than it would be with a reinforced film 100 of the present invention provided without such a release liner 140. In one such embodiment, the release liner 140 may comprise a non-silicone material, for example polyvinyl octadecylcarbamate or polyvinyl stearylcarbamate.

The optional release liner 140 may comprise any additional material necessary to provide material characteristics suitable for embodiments of the present invention. In that regard, the release liner 140 may also serve a secondary purpose, for example, in active combat situation as a floor covering or general purpose tarp. As such, the release liner 140 may comprise a substantially resilient material, such as nylon, vinyl, urethane, polyester, or the like.

Manufacturing a Reinforced Film

Manufacturing a reinforced film 100, in accordance with embodiments of the present invention, may be performed using any conventional film manufacturing process. In many embodiments, the layers of the reinforced film are manufactured in accordance with at least one of an extrusion, lamination or calendaring process.

In one exemplary embodiment, a reinforced film 100 may be manufactured in accordance with the following steps. The elastomeric polymer laminate 110 is prepared by extruding or calendaring a molten resin at a temperature between about 350 degrees Fahrenheit to about 500 degrees Fahrenheit, to form a laminate of desired thickness. The scrim layer 120 may be laminated to the molten laminate layer by passing through a nip roller at a pressure between about 30 psi to about 50 psi, and a roller temperature between about 50 degrees Fahrenheit to about 120 degrees Fahrenheit. An additional layer of molten resin may be applied over the exposed scrim layer to form an encapsulation of the scrim layer 120, and a reinforced film 100 in accordance with embodiments of the present invention.

Optionally, an adhesive layer 130 may be applied by laminating, transfer coating or direct coating on the reinforced film 100. Such adhesive layer 130 may be applied in-line with the above steps, or as a separate process.

The resulting reinforced film 100 may be manufactured in rolls, sheets, or tape form, for ease of transport and installation. In one embodiment, the reinforced film 100 is manufactured in sheets.

Application of Reinforced Film

Embodiments of the present invention may be applied to any surface of an object or structure for purposes of increasing the structural integrity of such surface. In many embodiments, the reinforced film 100 of embodiments of the present invention is attached to an interior or exterior wall of a dwelling or building to provide additional strength to the wall on which the reinforced film 100 is applied.

In one embodiment of the present invention, a reinforced film 100 comprising an adhesive layer 130 and release liner 140 is provided for application to a wall of a building. Generally, the release liner 140 may be removed to expose the adhesive layer 130 which subsequently is affixed to the wall in a "peel-and-stick" fashion. Optionally however, to facilitate a stronger bond between the reinforced film and the wall to be protected, upon removal of the release liner 140, the wall or surface may be coated with a primer or other chemical to facilitate stronger and/or faster bonding with the adhesive layer 130 on the reinforced film 100.

Alternatively, a second adhesive may be applied to the target surface (i.e., the wall of the structure) to enhance the bonding properties between the surface and the reinforced film 100. For example, a primer and/or adhesive may be sprayed, brushed or otherwise applied to the surface to be protected, prior to the application of the reinforced film 100. Similarly, initial cleaning of the target surface may also be desirable for better bonding. In accordance with embodiments of the present invention, additional adhesives, primers or chemicals may comprise any material or composition disclosed herein, or any additional suitable material or composition, as understood by those of ordinary skill in the industry.

In other embodiments of the present invention, the reinforced film 100 is provided without an adhesive layer 130. In such embodiments, affixing the reinforced film 100 to surfaces to be protected may utilize any fastening means suitable for embodiments of the present invention. In one embodiment, any number of fastening means may be implemented either alone or in combination to adequately affix a reinforced film 100 to a surface. In accordance with embodiments of the present invention, fastening means include a chemical fasteners (e.g., adhesives, epoxies, and the like) or mechanical fasteners (e.g., staples, nails, screws, bolts, clamps, or the like).

In one exemplary embodiment, the reinforced film 100 may be anchored to a wall, ceiling, or other desired structure, using clamps. Generally, a clamp comprises any suitable material, for example, any metal or polymer. A clamp affixes the reinforced film 100 to a surface by bracing itself into the frame of the structure, and providing sufficient force to retain the film against the desired surface. In many embodiments, a clamp may be used in conjunction with an adhesive on the reinforced film 100 to attain enhanced reinforcement properties. Such type of clamp is generally known in the industry, and in one embodiment is disclosed by U.S. Pat. No. 6,904,732, the disclosure of which, and its obvious improvements, is incorporated by reference herein in its entirety.

Figure 3:
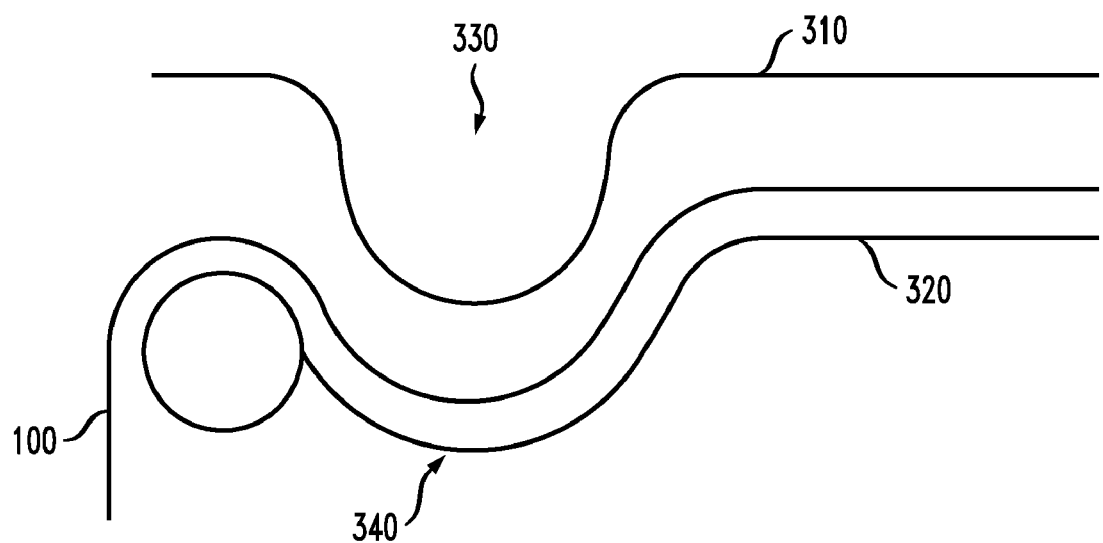
FIG. 3 depicts an exemplary clamp for use in fastening the reinforced film to a surface, in accordance with one embodiment of the present invention.

FIG. 3 depicts an exemplary clamp for use in fastening the reinforced film to a surface, in accordance with one embodiment of the present invention. As shown in FIG. 3, the clamp 300 comprises a first mounting bracket 310 and a second mounting bracket 320. Generally, each mounting bracket has a paired recessed portion 330, such that the recessed portion 340 of the first mounting bracket 310 mates within the recessed portion 350 of the second mounting bracket 320. In one embodiment, to secure a reinforced film 100, as depicted in FIG. 3, the pair of mounting brackets 310 and 320 may have a portion of the reinforced film 100 in substantially positioned in between the two brackets 310 and 320, and the respective recessed portions, and thus secures the reinforced film 100 in place.

Alternative embodiments of the present invention provide a reinforced film 100 may be manufactured directly onto, into with or against building/construction materials. For example, a reinforced film 100 may be adhered, laminated, extrusion coated, or fastened to a building material at the time of manufacture of the building construction material or at a time prior to distribution of the building materials. Exemplary building materials include, but are not limited to, wall panels, cellulosic sheets, plywood, drywall, Forticrete, cinderblocks, walling stone, brick, house wrap, sheathing, and the like.

In one exemplary embodiment, the reinforced film 100 is affixed to a sheet of drywall or plywood using any fastening means as disclosed herein. In another embodiment, the reinforced film 100 is provided as an extruded or laminated layer contained within the material construction of a cellulosic sheet or sheathing. In any such embodiment, structures may be built using standard construction techniques without the requirement of a specialist or technician on-site to apply the reinforced film 100 after the structure is built.

In many embodiments, it may be desirable to apply multiple layers of the reinforced film 100 on a surface. Generally, in order to apply multiple layers of reinforced film 100 on a surface, the processes discussed herein for applying a single layer of reinforced film 100 may be repeated (i.e., a subsequent layer may be applied on a first layer), until a desirable number of layers are covering a surface.

Protected Structures

The reinforced film 100 of embodiments of the present invention is capable of protecting many different types of surfaces and structures. The surfaces to be protected by embodiments of the present invention may comprise concrete, brick, wood, asphalt, glass, cellulosic fibers, dirt, clay, metal, plastic, or any other material generally used to construct surfaces of structures as described herein.

Generally, the reinforced film 100 may be applied to an interior-facing surface of an exterior wall of a building or other walled structure. The reinforced film 100 may also be applied to an outer-facing surface of an exterior wall, typically underneath an outer coating of building (e.g., siding, shingles, etc.). The reinforced film 100 increases the structural integrity of such wall surfaces, thus increasing critical extra time for occupants to exit or remove equipment from the structure before a possible structure collapse. The increased structural integrity may also prevent any exterior wall material from significantly penetrating the interior of the structure, thereby preventing injury to the occupants from flying debris and severe wall detent or deformation.

In another example, the reinforced film 100 may be applied to the inside and/or outside surfaces of armored or unarmored transport vehicles. The reinforced film 100 provides increased structural strength to the vehicle walls and/or other surfaces. Such an application may prevent or minimize injury to occupants of a vehicle, during an explosion or other assault.

In other embodiments, the reinforced film 100 may also be used in post-damage remedial actions. For example, damage to a vehicle may be temporarily fixed by applying the reinforced film 100 to a damaged area to provide the necessary remedial support so as to prevent further degradation to the damaged area.

In yet another embodiment, the reinforced film 100 may be used as structural reinforcement to non-occupant structures, such as levees and dams. For example, a reinforced film 100 may be applied to an inward-facing and/or outward-facing surface of a levee to increase its structural integrity and potentially prevent its rupture, or at a minimum, provide sufficient additional structural integrity until adequate preventative measures become available.

Safe Room

In accordance with embodiments of the present invention, a reinforced film 100 may be utilized to create a safe room. A safe room, as understood by those of ordinary skill in the industry, is generally defined as a room in a building or other structure, having structurally reinforced walls, including a ceiling, a floor and side walls, such that the entire room is encapsulated by some form of structural reinforcement. In one embodiment, a reinforced film 100 is applied to every interior surface in a room, including any side walls, the ceiling and the floor, to create a safe room. The reinforced film 100 may also or alternatively be applied to each exterior surface, opposing each interior surface in a room.

To build a safe room, the reinforced film 100 may directly be adhered or affixed to the surfaces of a currently existing room, either in single or multiple layers, using methods discussed herein. Alternatively, if the walls of a safe room have not yet been constructed, a safe room may be built using known building materials comprising at least a layer of reinforced film 100 on or within the material composition. In accordance with one embodiment of the present invention, if a safe room is constructed using building materials comprising a reinforced film 100, additional layers of the reinforced film 100 may be applied to the building materials after basic installation/construction of the walls is complete.

Experimental Test Data

Tables 1 and 2 depict ⅓ scale testing results of a reinforced film 100 in accordance with embodiments of the present invention. For purpose of testing, a reinforced film 100 comprising a elastomeric polymer laminate comprising a urethane blend of about 80% Estane 58887 and about 20% ETE 50DT3 was utilized. The scrim layer 120 comprises Kevlar fibers at about +/−60° orientation with a minimum of about 0.25 inch spacing between the fiber bundles in the scrim layer 120.

As shown in Table 1, the film had an average thickness of about 14.8 mils, and ranged in thickness between about 13.9 mils and about 15.3 mils.

TABLE 1

Film Thickness (in mils)
Test Method: ASTM D-3652

| | Roll Section | | |
| --- | --- | --- | --- |
| Sample | Left | Middle | Right |
| 1 | 14.8 | 15.3 | 14.8 |
| 2 | 14.6 | 15.4 | 14.7 |
| 3 | 13.9 | 14.7 | 15.3 |
| 4 | 14.3 | 15.0 | 14.2 |
| 5 | 14.9 | 15.0 | 15.1 |
| Mean (mils) | 14.5 | 15.1 | 14.8 |
| Average | | 14.8 | |
| STDV | | 0.3 | |

As shown in Table 2, tensile strengths and elongation percentages were measured. The tensile strength average was about 9,714 psi, or about 143 lbs/lineal inch of width tensile strength, and the percent elongation range was about 497% to about 551%. In a full scale test, the tensile strength approximates about 600 lbs/lineal inch as measured parallel to the aramid fiber orientation.

During the ⅓ scale testing, the adhesive layer 130 used on the reinforced film 100 required about 11 lbs of force per lineal inch to peel the adhesive from the surface of a standard size concrete block using a 180° reverse peel test. The adhesive layer 130 further required about 10 lbs of force per lineal inch to peel the adhesive from the surface of a standard sized American cinderblock using a 180° reverse peel test. In further testing of the adhesive layer 130 applied to the reinforced film 100, a standard size concrete block was adhered to the surface of the adhesive in a free hanging test, which took over about 1.5 hours for the free hanging concrete block to pull away from the adhesive layer 130.

TABLE 2

Tensile and Elongation
Test Method: ASTM D-3759
Sample Size: 4 Inches
Equipment: Instron 3345
Load Cell: 200 lbs
Jaw Separation: 2 inches
Crosshead Speed: 2 inches/min.

| | Tensile (lbs/in) | | Elongation |
|---|---|---|---|
| | Lbs/in | psi | % |
| Left | | | |
| 1 | 131.6 | 8891.9 | 519.9 |
| 2 | 149.5 | 10101.4 | 551.8 |
| 3 | 151.1 | 10209.5 | 548.0 |
| 4 | 144.7 | 9777.0 | 531.8 |
| 5 | 147.3 | 9952.7 | 551.8 |
| Mean | 144.8 | 9786.5 | 540.7 |
| Middle | | | |
| 1 | 136.2 | 9202.7 | 497.5 |
| 2 | 147.3 | 9952.7 | 499.7 |
| 3 | 150.5 | 10168.9 | 511.8 |
| 4 | 140.9 | 9520.3 | 499.3 |
| 5 | 151.4 | 10229.7 | 522.2 |
| Mean | 145.3 | 9814.9 | 506.1 |
| Right | | | |
| 1 | 150.8 | 10189.2 | 528.8 |
| 2 | 136.9 | 9250.0 | 492.8 |
| 3 | 141.6 | 9567.6 | 516.3 |
| 4 | 135.3 | 9141.9 | 484.7 |
| 5 | 141.6 | 9567.6 | 511.5 |
| Mean | 141.2 | 9543.2 | 506.8 |
| Average | 143.8 | 9714.9 | 517.9 |
| STDV | 2.2 | 149.3 | 19.7 |

Table 3 depicts the results of a puncture test of a reinforced film 100 in accordance with embodiments of the present invention. In accordance with the testing parameters, the reinforced film 100 was tested at three locations for puncture resistance: a urethane window (i.e., through the spacing in the scrim layer), a flat scrim (i.e., through a set of scrim fiber bundles), and crossed scrim (at a position of the overlap of bidirectional scrim fiber bundles). The reinforced film 100 was tested as single, double and triple layered. For each of the single, double and triple layers, the quantity of each location on a 1 square inch piece of reinforced film was determined.

TABLE 3

Puncture results by Location
Puncture in (Lbs)
0.166" radius probe @ 2 inches/min

| Sample | Single Layer | Double Layer | Triple Layer |
|---|---|---|---|
| Urethane Window | | | |
| 1 | 97.17 | 151.50 | 233.85 |
| 2 | 126.47 | 194.26 | 184.07 |
| 3 | 123.48 | 200.64 | 220.20 |
| 4 | 114.46 | 166.55 | 240.67 |
| 5 | 102.50 | 202.20 | 202.50 |
| Average | 112.82 | 183.03 | 216.26 |
| Crossed Scrim | | | |
| 1 | 209.06 | 256.34 | 576.61 |
| 2 | 240.87 | 233.94 | 425.12 |
| 3 | 261.61 | 289.04 | 543.67 |
| 4 | 192.39 | 321.99 | 583.65 |
| 5 | 268.52 | 224.24 | 544.79 |
| Average | 234.49 | 265.11 | 534.77 |
| Flat Scrim | | | |
| 1 | 107.42 | 212.38 | 244.93 |
| 2 | 114.95 | 148.81 | 208.48 |
| 3 | 106.29 | 189.90 | 239.74 |
| 4 | 126.19 | 174.44 | 195.73 |
| 5 | 94.62 | 210.24 | 261.04 |
| Average | 109.89 | 187.15 | 229.98 |

Figure 4:
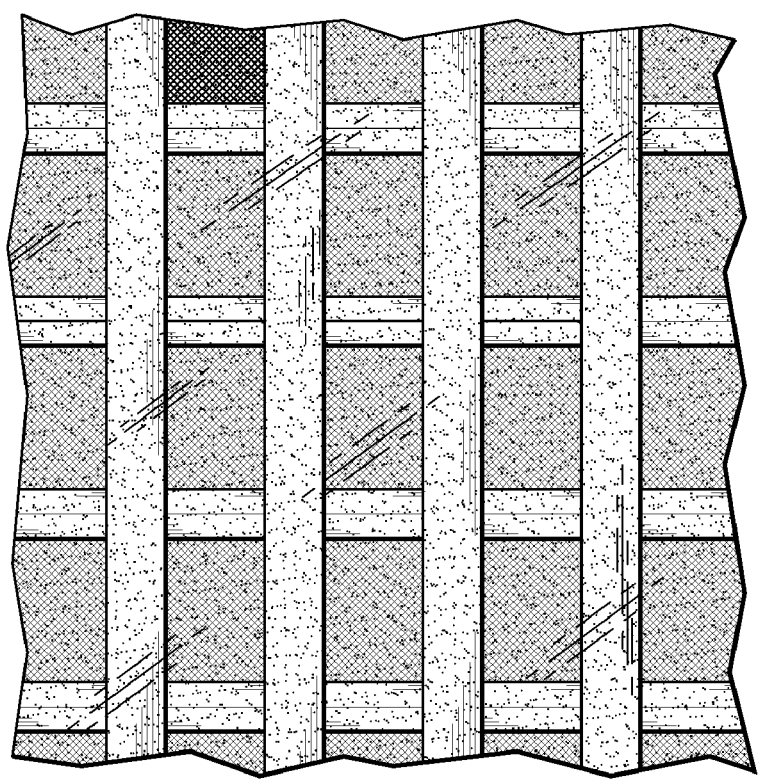
FIG. 4 depicts one exemplary embodiment of a reinforced film used during experimental puncture resistance testing in accordance with embodiments of the present invention.

In Table 4, the average puncture resistance for each location was multiplied by the quantity of each location in an area of 1 square inch of reinforced film, and the sum of all three location results was then calculated. FIG. 4 depicts one exemplary embodiment of a reinforced film used during experimental puncture resistance testing in accordance with embodiments of the present invention.

TABLE 4

Determination of Force needed to Puncture 1 Square Inch

| | | Average Puncture | | |
|---|---|---|---|---|
| | Quantity per Square Inch | Single Layer | Double Layer | Triple Layer |
| Urethane Window | 9 windows | 112.81 | 183.03 | 216.26 |
| Flat scrim | 24 fiber bundles | 109.89 | 187.15 | 229.98 |
| Crossed Scrim | 16 crossover points | 234.49 | 265.11 | 534.77 |
| Total Force (lbs) to Puncture 1 in² | | 7404.49 | 10380.63 | 16022.18 |

While the foregoing is directed to embodiments of the present invention, other and further embodiments of the invention may be devised without departing from the basic scope thereof.

What is claimed is:

1. A reinforced film, consisting essentially of:
 a first layer of an elastomeric polymer material;
 a second layer of an elastomeric polymer material;
 an adhesive layer; and
 a scrim layer of a scrim material,
 wherein the reinforced film is arranged in the order of the first layer, the scrim layer, the second layer, and the adhesive layer, and
 wherein the reinforced film has a puncture resistance in a range between about 3000 psi and about 25000 psi
 wherein the adhesive layer comprises a pressure sensitive adhesive and a release liner associated therewith.

2. The reinforced film of claim 1, wherein the scrim material comprises a plurality of aramid fibers.

3. The reinforced film of claim 2, wherein the plurality of aramid fibers are selected from the group consisting of polymetaphenylene isophthalamide fibers and poly-p-phenylene terephthalamide fibers.

4. The reinforced film of claim 1, wherein the scrim layer comprises a polyaramid.

5. The reinforced film of claim 1, wherein the elastomeric polymer material is selected from the group consisting of polyurethane, silicone, polyethylene, polypropylene, and rubber.

6. The reinforced film of claim 1, wherein the elastomeric polymer material comprises polyurethane.

7. The reinforced film of claim 1, wherein the adhesive layer comprises at least one adhesive selected from the group consisting of an anaerobic, a cyanoacrylate, an epoxy, a phenolic, a polyimide, a hot melt, a natural rubber, a synthetic rubbers, a plastisol, a polyvinyl acetate (PVA), and a pressure sensitive adhesive, and blends of at least two of the foregoing.

8. The reinforced film of claim 1, wherein the pressure sensitive adhesive comprises an acrylic pressure sensitive adhesive, a urethane-based pressure sensitive adhesive, an antioxidant, a solvent, a UV stabilizer and a catalyst.

9. The reinforced film of claim 8, wherein the pressure sensitive adhesive comprises from about 70% to about 95% acrylic pressure sensitive adhesive and from about 5% to about 15% urethane-based pressure sensitive adhesive.

10. The reinforced film of claim 9, wherein the pressure sensitive adhesive comprises from about 1% to about 2% of the solvent and up to about 1% of the catalyst.

11. A reinforced film, consisting essentially of:
a) an elastomeric polymer layer comprising a polyurethane;
b) an aramid-based scrim layer associated with the elastomeric polymer material layer;
c) a pressure sensitive adhesive layer associated with the elastomeric polymer material; and
d) a release liner layer,
wherein the reinforced film is arranged in the order of the release liner layer, the pressure sensitive adhesive layer, the elastomeric polymer layer, and the scrim layer.

12. The reinforced film of claim 11, wherein the reinforced film has a puncture resistance of at least about 5000 psi.

13. The reinforced film of claim 11, wherein the pressure sensitive adhesive layer comprises an acrylic-based pressure sensitive adhesive, a urethane-based pressure sensitive adhesive, an antioxidant, a solvent and a catalyst.

14. The reinforced film of claim 11, wherein the pressure sensitive adhesive layer comprises from about 70% to about 95% acrylic pressure sensitive adhesive and from about 5% to about 15% urethane-based pressure sensitive adhesive.

15. The reinforced film of claim 13, wherein the catalyst comprises an isocyanate.

16. The reinforced film of claim 11, wherein the urethane comprises one or more aromatic, polyether-based thermoplastic polyurethanes.

17. The reinforced film of claim 11, wherein the aramid-based scrim layer comprises a plurality of aramid fibers selected from the group consisting of polymetaphenylene isophthalamide fibers and poly-p-phenylene terephthalamide fibers.

18. The reinforced film of claim 11, wherein the scrim layer comprises a polyaramid.

19. A multi-layer film consisting essentially of,
(a) an elastomeric layer having a thickness of between about 2 mils and about 75 mils;
(b) a fibrous layer comprising a plurality of fibers of between about 1000 to about 4000 denier; and
(c) an adhesive layer, wherein
the multi-layer film has a puncture resistance of between 3,000 psi and 25,000 psi as determined according to ASTM D-3759, the multi-layer film has a first surface comprising the adhesive layer, and the multilayer film is configured to be a roll.

20. The film of claim 19, wherein the fibrous layer has a thickness of between about 5 mils to about 25 mils.

21. The film of claim 19, wherein the fibrous layer has a fiber count of between about 1×1 to about 50×50.

22. The film of claim 19, wherein the elastomeric layer comprises a composition selected from the group consisting of urethane, silicone, polyethylene, polypropylene, rubber and blends of the foregoing.

23. The film of claim 19, wherein the fibrous layer has from about 12 to about 20 fiber crossover points per square inch.

24. The film of claim 23, wherein the fibers have a plurality of openings between the fibers, wherein the openings have a puncture resistance of at least about 100 lbs, as determined by moving a 0.166 inch radius probe at a rate of 2 inches/min. into contact with one opening.

25. The film of claim 23, wherein the film has from about 6 openings to about 15 openings per square inch.

26. The film of claim 23, wherein the fibrous layer further comprises a scrim adhesive, the scrim adhesive binding the fibers at the crossover points.

27. The film of claim 19, wherein the fibers include at least one fiber selected from the group consisting of para-aramid fibers, meta-aramid fibers, sulfron fibers, nylon fibers, polyethylene fibers, glass fibers, carbon fibers, metal fibers, metallic alloy fibers, and combinations of the foregoing.

28. A reinforcement film, consisting essentially of: a polymeric layer, a scrim layer, an adhesive layer, and a removable release liner, wherein the film is arranged in the order of the scrim layer, the polymeric layer, the adhesive layer, and the removable release liner,
wherein the film has a puncture resistance after the removable release liner is removed to expose the adhesive layer of between 3,000 psi and 25,000 psi as determined according to ASTM D-3759 and wherein the reinforced film is configured to be rolls.

29. The film of claim 28, wherein the polymeric layer comprises an blend of thermoplastic elastomeric polyurethane materials.

30. The film of claim 28, wherein the polymeric layer is an extruded polymeric layer and wherein the polymeric layer and the scrim layer are laminated to each other.

31. The film of claim 28, wherein the scrim layer comprises a plurality of polyaramid fibers.

32. The film of claim 31, wherein the scrim layer further comprises a polyurethane adhesive associated with the plurality of polyaramid fibers.

33. The film of claim 28, wherein the adhesive layer comprises a blend of a urethane pressure-sensitive adhesive and an acrylic pressure-sensitive adhesive.

34. The film of claim 28, wherein the film has an adhesive layer thickness of about 7 mils, a polymeric layer thickness of from about 5 to about 75 mils, and a scrim layer thickness of from about 5 to about 25 mils.

35. A multi-layer film, consisting essentially of:
(a) at least one fibrous scrim layer having a first side and a second side and comprising a plurality of either fiber bundles, fiber strands or a mixture of fiber bundles and fiber strands, the fibers being between about 1,000 to about 10,000 denier, the fibrous scrim layer having a plurality of openings between the fiber bundles or strands;

(b) at least one elastomeric layer associated with each side of the fibrous scrim layer, each elastomeric layer having a thickness of between about 2 mils and about 75 mils; and, (c) a pressure sensitive adhesive layer, wherein the multi-layer film has a puncture resistance of between 3,000 psi and 25,000 psi as determined according to ASTM D-3759 and is configured as a roll.

36. The multi-layer film of claim 35, wherein the scrim fibrous layer further comprises a plurality of fibers oriented in the warp direction.

37. The multi-layer film of claim 35, wherein the at least one scrim fibrous layer comprises a plurality of scrim fibrous layers, wherein adjacent scrim layers are oriented either overlapped, cross-directional or separated by at least one layer of elastomeric material.

38. The film of claim 19, wherein the plurality of fibers are either fiber bundles, fiber strands or mixtures of the foregoing.

39. The film of claim 1, wherein the at least one layer of scrim material is at least partially embedded or encapsulated within the at least one layer of elastomeric polymer material.

40. The film of claim 1, wherein the film has a puncture resistance in a range between about 10,000 and 20,000 psi.

41. The film of claim 1, wherein the film has a puncture resistance of at least 5,000 psi and a percent elongation range of about 497% to about 551%.

42. The film of claim 1, wherein the reinforced film is configured to be rolls.

43. The film of claim 11, further comprising a release liner layer.

* * * * *